(12) United States Patent
Ishida et al.

(10) Patent No.: US 12,104,229 B1
(45) Date of Patent: Oct. 1, 2024

(54) CEMENTED CARBIDE AND TOOL CONTAINING THE SAME

(71) Applicant: Sumitomo Electric Hardmetal Corp., Itami (JP)

(72) Inventors: Tomoyuki Ishida, Itami (JP); Yuki Tanaka, Itami (JP); Kazuhiro Hirose, Itami (JP); Yasuki Kido, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 18/572,807

(22) PCT Filed: May 12, 2023

(86) PCT No.: PCT/JP2023/017869
§ 371 (c)(1),
(2) Date: Dec. 21, 2023

(51) Int. Cl.
*C22C 29/08* (2006.01)
*C22C 29/02* (2006.01)
*C22C 29/06* (2006.01)

(52) U.S. Cl.
CPC .............. *C22C 29/08* (2013.01); *C22C 29/02* (2013.01); *C22C 29/067* (2013.01)

(58) Field of Classification Search
CPC ........ C22C 29/02; C22C 29/08; C22C 29/067
See application file for complete search history.

(56) References Cited

U.S. PATENT DOCUMENTS

| 2020/0047257 A1 | 2/2020 | Yamasaki et al. |
| 2022/0090237 A1 | 3/2022 | Fukae et al. |
| 2023/0278109 A1 | 9/2023 | Kido et al. |

FOREIGN PATENT DOCUMENTS

| EP | 4275822 A1 | 11/2023 |
| JP | 2005-200671 A | 7/2005 |
| JP | 2009-024214 A | 2/2009 |
| JP | 2013-060666 A | 4/2013 |
| JP | 2016-098393 A | 5/2016 |
| JP | 2020-157473 A | 10/2020 |
| JP | 2021-134364 A | 9/2021 |
| JP | 6969732 B1 | 11/2021 |
| JP | 7283636 B1 | 5/2023 |
| WO | 2018/180911 A1 | 10/2018 |
| WO | 2022/209336 A1 | 10/2022 |
| WO | 2023/053441 A1 | 4/2023 |

OTHER PUBLICATIONS

Written Opinion mailed on Aug. 1, 2023, received for PCT Application PCT/JP2023/017869, filed on May 12, 2023, 9 pages including English Translation.

*Primary Examiner* — Alexandra M Moore
(74) *Attorney, Agent, or Firm* — XSENSUS LLP

(57) ABSTRACT

A cemented carbide is composed of a first hard phase, a second hard phase, and a binder phase, wherein the first hard phase is composed of tungsten carbide particles and having a particle diameter D10 of 0.30 μm to 0.60 μm, a particle diameter D90 of 0.90 μm to 1.40 μm, the second hard phase contains at least one first compound selected from the group consisting of TiNbC, TiNbN, and TiNbCN, and having an average particle diameter of 0.03 μm to 0.50 μm, a content of the binder phase in the cemented carbide is 8.0 vol % to 16.0 vol %, an average particle diameter of the binder phase is 0.15 μm to 0.45, a particle diameter D95 of the binder phase is 1.5 μm or less, and a degree of dispersion of the binder phase is 0.15 to 0.25.

4 Claims, 1 Drawing Sheet

CEMENTED CARBIDE AND TOOL CONTAINING THE SAME

CROSS-REFERENCE TO RELATED APPLICATION

The present application is based on PCT filing PCT/JP2023/017869, filed May 12, 2023, the entire contents of which are incorporated herein by reference.

TECHNICAL FIELD

The present disclosure relates to a cemented carbide and a tool containing the same.

BACKGROUND ART

A cemented carbide that has a phase mainly composed of tungsten carbide (WC) and a binder phase mainly composed of an iron-group element has been conventionally used for a material of a cutting tool (PTL 1 to PTL 5).

CITATION LIST

Patent Literature

PTL 1: Japanese Patent Laying-Open No. 2009-024214
PTL 2: Japanese Patent Laying-Open No. 2013-060666
PTL 3: WO 2018/180911
PTL 4: Japanese Patent Laying-Open No. 2021-134364
PTL 5: Japanese Patent Laying-Open No. 2016-098393

SUMMARY OF INVENTION

A cemented carbide of the present disclosure is a cemented carbide composed of first hard phase, a second hard phase, and a binder phase, wherein
  the first hard phase is composed of tungsten carbide particles,
  a cumulative 10% particle diameter D10 of the first hard phase on an area basis is 0.30 μm or more and 0.60 μm or less,
  a cumulative 90% particle diameter D90 of the first hard phase on an area basis is 0.90 μm or more and 1.40 μm or less,
  the second hard phase contains at least one first compound selected from the group consisting of TiNbC, TiNbN, and TiNbCN,
  a content of the second hard phase in the cemented carbide is 0.10 vol % or more and 0.50 vol % or less,
  an average particle diameter of the second hard phase is 0.03 μm or more and 0.50 μm or less,
  the binder phase contains cobalt at 80 mass % or more,
  a content of the binder phase in the cemented carbide is 8.0 vol % or more and 16.0 vol % or less,
  an average particle diameter of the binder phase is 0.15 μm or more and 0.45 μm or less,
  a cumulative 95% particle diameter D95 of the binder phase on an area basis is 1.5 μm or less, and
  a degree of dispersion of the binder phase is 0.15 or more and 0.25 or less.

DETAILED DESCRIPTION

Figure 1:
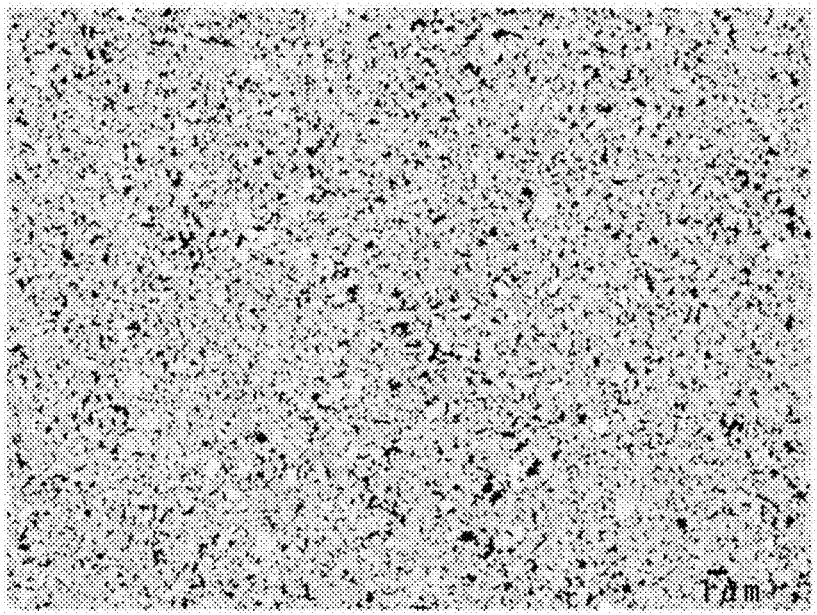
FIG. 1 is an image that shows an example of a backscattered electron image of a cemented carbide of Embodiment 1.

Problem to be Solved by the Present Disclosure

There has been more and more strict requirement of cost reduction in recent years. For example, in high-efficiency processing of a hard-to-cut material such as titanium alloy and stainless steel, a tool that has a long lifetime has been required. Accordingly, an object of the present disclosure is to provide a cemented carbide that can lengthen the lifetime of a tool when used as a material for a tool, and a tool that contains the same.

Advantageous Effect of the Present Disclosure

The cemented carbide of the present disclosure can lengthen the lifetime of the tool when used as the material for a tool. A tool that contains the cemented carbide of the present disclosure can have a long tool lifetime.

DESCRIPTION OF EMBODIMENTS

First, aspects of the present disclosure will be listed and described.

(1) A cemented carbide of the present disclosure is a cemented carbide composed of a first hard phase, a second hard phase, and a binder phase, wherein
  the first hard phase is composed of tungsten carbide particles,
  a cumulative 10% particle diameter D10 of the first hard phase on an area basis is 0.30 μm or more and 0.60 μm or less,
  a cumulative 90% particle diameter D90 of the first hard phase on an area basis is 0.90 μm or more and 1.40 μm or less,
  the second hard phase contains at least one first compound selected from the group consisting of TiNbC, TiNbN, and TiNbCN,
  a content of the second hard phase in the cemented carbide is 0.10 vol % or more and 0.50 vol % or less,
  an average particle diameter of the second hard phase is 0.03 μm or more and 0.50 μm or less,
  the binder phase contains cobalt at 80 mass % or more,
  a content of the binder phase in the cemented carbide is 8.0 vol % or more and 16.0 vol % or less,
  an average particle diameter of the binder phase is 0.15 μm or more and 0.45 μm or less,
  a cumulative 95% particle diameter D95 of the binder phase on an area basis is 1.5 μm or less, and
  a degree of dispersion of the binder phase is 0.15 or more and 0.25 or less.

The cemented carbide of the present disclosure can lengthen the lifetime of the tool when used as the material for a tool.

(2) According to the above (1), in the cemented carbide, a percentage of niobium relative to a total of titanium and niobium on a mass basis may be 3% or more and 20% or less. This can finely disperse the second hard phase in the cemented carbide, and can improve welding resistance of the cemented carbide.

(3) According to the above (1) or (2), the degree of dispersion is a standard deviation of an area of each Voronoi cell in a Voronoi diagram that is obtained by performing a Voronoi partition with a center of gravity of the binder phase as a generator, and the Voronoi diagram is obtained by extracting the binder phases in a backscattered electron image obtained by capturing a cross section of the cemented carbide with a scanning electron microscope, setting a 40.3 μm×30.2 μm rectangular measurement visual field in an image resulting from a binarization treatment of the backscattered electron image, performing Voronoi partitions with centers of gravity of the extracted binder phases as generators and calculating Voronoi cells of all of the generators.

(4) The present disclosure is a tool comprising the cemented carbide according to any of the above (1) to (3). The tool of the present disclosure can have a long tool lifetime.

Detailed Description of Embodiments

A description of a form "A to B" herein means an upper and lower limits of a range (that is, A or more and B or less). When A has no description of a unit and only B has a description of a unit, the unit of A and the unit of B are same.

When a compound and the like are represented by a chemical formula herein, any conventionally known atomic ratios are included unless the atomic ratio is particularly limited, and should not be necessarily limited to only an atomic ratio within a stoichiometric range. For example, when "TiNbC" is described, a ratio of numbers of atoms that constitute TiNbC includes any conventionally known atomic ratios.

When a pressure is described herein, the pressure means a pressure based on an atmospheric pressure unless otherwise particularly limited.

With reference to the drawings, specific examples of the cemented carbide of the present disclosure and tool that contains the same will be described hereinafter. In the drawings of the present disclosure, a same reference sign represents same parts or corresponding parts. Dimensions such as length, width, thickness, and depth are appropriately modified to clarify and simplify the drawings, and do not always represent actual dimensions.

Embodiment 1: Cemented Carbide

A cemented carbide of an embodiment of the present disclosure (hereinafter, also referred to as "Embodiment 1") is a cemented carbide of the present disclosure is a cemented carbide composed of a first hard phase, a second hard phase, and a binder phase, wherein the first hard phase is composed of tungsten carbide particles, a cumulative 10% particle diameter $D10$ of the first hard phase on an area basis is 0.30 μm or more and 0.60 μm or less, a cumulative 90% particle diameter $D90$ of the first hard phase on an area basis is 0.90 μm or more and 1.40 μm or less, the second hard phase contains at least one first compound selected from the group consisting of TiNbC, TiNbN, and TiNbCN, a content of the second hard phase in the cemented carbide is 0.10 vol % or more and 0.50 vol % or less, an average particle diameter of the second hard phase is 0.03 μm or more and 0.50 μm or less, the binder phase contains cobalt at 80 mass % or more, a content of the binder phase in the cemented carbide is 8.0 vol % or more and 16.0 vol % or less, an average particle diameter of the binder phase is 0.15 μm or more and 0.45 μm or less, a cumulative 95% particle diameter $D95$ of the binder phase on an area basis is 1.5 μm or less, and a degree of dispersion of the binder phase is 0.15 or more and 0.25 or less.

The tool that contains the cemented carbide of the present disclosure can have a long tool lifetime. The reason is presumed as follows.

(i) In the cemented carbide of the present disclosure, the first hard phase is composed of tungsten carbide particles, a cumulative 10% particle diameter $D10$ of the first hard phase on an area basis is 0.30 μm or more and 0.60 μm or less, and a cumulative 90% particle diameter $D90$ of the first hard phase on an area basis is 0.90 μm or more and 1.40 μm or less. According to this, the cemented carbide has excellent balance between mechanical strength and hardness, and can achieve both of excellent breakage resistance and wearing resistance.

(ii) In the cemented carbide of the present disclosure, the second hard phase contains at least one first compound selected from the group consisting of TiNbC, TiNbN, and TiNbCN, a content of the second hard phase in the cemented carbide is 0.10 vol % or more and 0.50 vol % or less, and an average particle diameter of the second hard phase is 0.03 μm or more and 0.50 μm or less. According to this, the second hard phase can finely divide the binder phase, and the cemented carbide can have excellent welding resistance. In addition, deterioration of mechanical strength caused by abnormality of structure of the cemented carbide, such as generation of an aggregate in the second hard phase and occurrence of a coarse second hard phase, hardly occurs, and the cemented carbide can have excellent breakage resistance.

(iii) In the cemented carbide of the present disclosure, the binder phase contains cobalt at 80 mass % or more, and a content of the binder phase in the cemented carbide is 8.0 vol % or more and 16.0 vol % or less. According to this, the cemented carbide has excellent mechanical strength, can have excellent breakage resistance, and has good welding resistance. In the cemented carbide of the present disclosure, an average particle diameter of the binder phase is 0.15 μm or more and 0.45 μm or less, a cumulative 95% particle diameter $D95$ of the binder phase on an area basis is 1.5 μm or less, and a degree of dispersion of the binder phase is 0.15 or more and 0.25 or less.

According to this, the binder phase is finely dispersed in the cemented carbide, and the cemented carbide can have excellent welding resistance.

<Composition of Cemented Carbide>

The cemented carbide of Embodiment 1 is composed of the first hard phase, the second hard phase, and the binder phase. The cemented carbide of Embodiment 1 may contain an impurity as long as the effect of the present disclosure is not impaired. That is, the cemented carbide may comprise the first hard phase, the second hard phase, the binder phase, and the impurity. Examples of the impurity include iron (Fe), molybdenum (Mo), calcium (Ca), silicon (Si), and sulfur (S). A content of the impurity (in a case of two or more types of the impurity, a total content thereof) in the cemented carbide is preferably 0 mass % or more and less than 0.1 mass %. The content of the impurity in the cemented carbide is measured by Inductively Coupled Plasma (ICP) Emission Spectroscopy (measurement apparatus: "ICPS-8100" ™, SHIMADZU CORPORATION).

In Embodiment 1, a content of the first hard phase in the cemented carbide may be a value of subtracting the content of the second hard phase and the content of the binder phase from 100 vol %, wherein an entirety of the cemented carbide is 100 vol %. The content of the second hard phase in the cemented carbide and the content of the binder phase in the cemented carbide will be described later. The content of the first hard phase in the cemented carbide may be 83.5 vol % or more and 91.9 vol % or less, for example.

In Embodiment 1, the content of the second hard phase in the cemented carbide is 0.10 vol % or more and 0.50 vol % or less. According to this, welding resistance of the cemented carbide is easily improved. If the content of the second hard phase is less than 0.10 vol %, the existence amount of the second hard phase is small and thus yield insufficient effect of dividing the binder phase, which fails to improve fine dispersibility of the binder phase. A content of the second hard phase of more than 0.50 vol % causes abnormal structure such as generation of an aggregate of the second hard phase, which cannot achieve at least one of good fine dispersibility of the binder phase and mechanical strength. A lower limit of the content of the second hard phase in the cemented carbide may be 0.15 vol % or more, may be 0.20 vol % or more, or may be 0.30 vol % or more. An upper limit of the content of the second hard phase in the cemented carbide may be 0.45 vol % or less, or may be 0.40 vol % or less. The content of the second hard phase in the cemented carbide may be 0.15 vol % or more and 0.45 vol % or less, or may be 0.20 vol % or more and 0.40 vol % or less.

In Embodiment 1, the content of the binder phase in the cemented carbide is 8.0 vol % or more and 16.0 vol % or less. According to this, strength of the cemented carbide is easily improved. If the content of the binder phase is less than 8.0 vol %, mechanical strength is low to easily cause breakage. If the content is more than 16.0 vol %, a volume of the binder phase becomes large and thus deteriorates welding resistance. A lower limit of the content of the binder phase in the cemented carbide may be 10.0 vol % or more, may be 12.0 vol % or more, or may be 13.0 vol % or more. An upper limit of the content of the binder phase in the cemented carbide may be 14.0 vol % or less. The content of the binder phase in the cemented carbide may be 10.0 vol % or more and 16.0 vol % or less, or may be 12.0 vol % or more and 14.0 vol % or less.

Measurement methods of the content of the first hard phase, content of the second hard phase, and content of the binder phase in the cemented carbide are as follows.

(A1) A given surface or a given cross section of the cemented carbide is subjected to mirror-surface processing. Examples of a method for the mirror-surface processing include a method of polishing with a diamond paste, a method of using a focused ion-beam apparatus (FIB apparatus), a method of using a cross-section polisher apparatus (CP apparatus), and a method of combination thereof, or the like.

(B1) The processed surface of the cemented carbide is micrographed with a scanning electron microscope ("JSM-7800F", manufactured by JEOL Ltd.) to obtain a backscattered electron image. Five of the backscattered electron image are prepared. The five backscattered electron images have micrographed regions that differ from each other. The micrographed position may be randomly set. The conditions of the backscattered electron image are an observation magnification of 3000 and acceleration voltage of 5 kV. The micrographed regions of the backscattered electron images are set to central portions of the cross section of the cemented carbide (where the micrographed regions are all the bulk portions of the cemented carbide), namely positions that do not include a portion where properties obviously differ from those of the bulk portion, such as a proximity of the surface of the cemented carbide.

FIG. 1 shows an example of the backscattered electron image of the cemented carbide of Embodiment 1. In FIG. 1, a white region corresponds to the first hard phase, a gray region corresponds to the binder phase, and a black region corresponds to the second hard phase.

(C1) The micrographed regions of the above (B1) are subjected to elemental analysis by using an energy dispersive X-ray analyzer attached to the SEM (SEM-EDX) to obtain an elemental mapping image.

(D1) The backscattered electron image obtained in the above (B1) is input into a computer to perform a binarization process using an image analysis software (ImageJ ver. 1.51J8). The binarization process is performed with a first binarization process and a second binarization process that use two different threshold values.

In the first binarization process, the backscattered electron image is input into a computer so as to extract only the second hard phase among the first hard phase, the second hard phase, and the binder phase in the backscattered electron image. In an image after the first binarization process, the second hard phase is indicated in black, and the first hard phase and the binder phase are indicated in white.

In the second binarization process, the backscattered electron image same as the backscattered electron image used in the first binarization process is newly input into a computer so as to extract the second hard phase and the binder phase in the backscattered electron image. In an image after the second binarization process, the second hard phase and the binder phase are indicated in black, and the first hard phase is indicated in white. Since varying depending on the contrast, the threshold values of the binarization are set in each image.

(E1) The elemental mapping image obtained in the above (C1), and the image after the first binarization process and the image after the second binarization process obtained in the above (D1) are overlapped to obtain a first image in which existence regions of each of the first hard phase, the second hard phase, and the binder phase are specified. In the first image, a region indicated in white in the image after the second binarization process and in which tungsten (W) and carbon (C) are present in the elemental mapping image corresponds to the existence region of the first hard phase. In the first image, a region indicated in white in the image after the first binarization process, indicated in black in the image after the second binarization process, and in which cobalt is present in the elemental mapping image corresponds to the existence region of the binder phase. In the first image, a region indicated in black in the image after the first binarization process and that is other than the existence region of the first hard phase and the existence region of the binder phase specified above corresponds to the existence region of the second hard phase.

(F1) A rectangular measurement field with 40.3 μm in length×30.2 μm in width is each set in five of the first images. Using the above image analysis software, an area percentage of each of the first hard phase, the second hard phase, and the binder phase is measured based on an area of an entirety of the measurement field as a denominator.

(G1) In the present disclosure, an average of the area percentages of the first hard phase in the five measurement fields corresponds to the content (vol %) of the first hard phase in the cemented carbide, an average of the area percentages of the second hard phase in the five measurement fields corresponds to the content (vol %) of the second hard phase in the cemented carbide, and an average of the area percentages of the binder phase in the five measurement fields corresponds to the content (vol %) of the binder phase in the cemented carbide.

In the measurements by the applicant, it has been confirmed that even when a plurality of measurements are performed for the content of the first hard phase, the content of the second hard phase, and the content of the binder phase in the cemented carbide in accordance with the above procedure, the measurement results have almost no variation as long as the identical sample is measured, wherein in the above procedure, a cutout portion for the cross section of the cemented carbide is randomly set, a micrographic region as described in the above (B1) is randomly set on the cross section, and five measurement fields as described in the above (F1) are randomly set.

<First Hard Phase>
<<Composition>>

In Embodiment 1, the first hard phase is composed of tungsten carbide particles (hereinafter, also referred to as "WC particles"). The tungsten carbide particles (hereinafter, also referred to as "WC particles") are particles composed of tungsten carbide. The first hard phase may contain iron (Fe), molybdenum (Mo), calcium (Ca), silicon (Si), sulfur (S), and the like inside the WC particles or in addition to the WC particles as long as the effect of the present disclosure is not impaired. A content (in a case of two or more types, a total of contents thereof) of iron (Fe), molybdenum (Mo), calcium (Ca), silicon (Si), and sulfur (S) in the first hard phase is preferably 0 mass % or more and less than 0.1 mass %. The contents of iron (Fe), molybdenum (Mo), calcium (Ca), silicon (Si), and sulfur (S) in the first hard phase are measured by ICP emission spectroscopy.

<<D10 and D90>>

In Embodiment 1, a cumulative 10% particle diameter D10 on an area basis of the first hard phase (hereinafter, also referred to as "D10 of the first hard phase") is 0.30 μm or more and 0.60 μm or less, and a cumulative 90% particle diameter D90 on an area basis of the first hard phase (hereinafter, also referred to as "D90 of the first hard phase") is 0.90 μm or more and 1.40 μm or less. According to this, the cemented carbide has high hardness, and the tool that contains this cemented carbide can have excellent wearing resistance. In addition, such a tool can have excellent snapping resistance. If D10 and D90 of the first hard phase are each less than the lower limit, the mechanical strength is low to easily occur breakage. If D10 and D90 of the first hard phase are each more than the upper limit, the hardness is low and thus deteriorates wearing resistance.

The lower limit of D10 of the first hard phase may be 0.33 μm or more, may be 0.36 μm or more, may be 0.38 μm or more, or may be 0.40 μm or more. The upper limit of D10 of the first hard phase may be 0.55 μm or less, may be 0.53 μm or less, may be 0.50 μm or less, or may be 0.45 μm or less. D10 of the first hard phase may be 0.33 μm or more and 0.55 μm or less, or may be 0.36 μm or more and 0.53 μm or less.

A lower limit of D90 of the first hard phase may be 0.95 μm or more, may be 1.00 μm or more, may be 1.05 μm or more, or may be 1.10 μm or more. An upper limit of D90 of the first hard phase may be 1.30 μm or less, may be 1.25 μm or less, or may be 1.24 μm or less. D90 of the first hard phase may be 0.95 μm or more and 1.30 μm or less, or may be 1.00 μm or more and 1.25 μm or less.

In Embodiment 1, a lower limit of the average particle diameter of the first hard phase may be 0.60 μm or more, or may be 0.70 μm or more. An upper limit of the average particle diameter of the first hard phase may be 0.90 μm or less, or may be 0.80 μm or less. The average particle diameter of the first hard phase may be 0.60 μm or more and 0.90 μm or less, or may be 0.70 μm or more and 0.80 μm or less. The average particle diameter of the first hard phase herein means an arithmetical average of equal area circle diameters (Heywood diameters, which are also referred to as "equivalent area diameters" hereinafter) of the first hard phase measured by the following measurement method.

In the present disclosure, measurement methods of D10, D90, and the average particle diameter of the first hard phase are as follows.

(A2) In the same method as of (A1) to (E1) of the aforementioned method for measuring the content of the first hard phase, the content of the second hard phase, and the content of the binder phase in the cemented carbide, the existence region of the first hard phase is specified in the first image.

(B2) A rectangular measurement field with 40.3 μm in length×30.2 μm in width is each set in five of the first images. Using the image analysis software (ImageJ ver. 1.51J8), an outer edge of each first hard phase in the measurement field is specified to calculate an equivalent area diameter of each first hard phase.

(C2) Based on all the equivalent area diameters of the first hard phase in the five measurement fields, D10, D90, and the average particle diameter of the first hard phase are calculated.

In the measurements by the applicant, it has been confirmed that even when a plurality of measurements are performed for D10, D90, and the average particle diameter of the first hard phase in accordance with the above procedure, the measurement results have almost no variation as long as the identical sample is measured, wherein in the above procedure, a cutout portion for the cross section of the cemented carbide is randomly set, a micrographic region as described in the above (B1) is randomly set on the cross section, and measurement fields as described in the above (B2) are randomly set.

<Second Hard Phase>
<<Composition>>

In Embodiment 1, the second hard phase contains at least one first compound selected from the group consisting of TiNbC, TiNbN, and TiNbCN. According to this, welding resistance of the cemented carbide is improved.

The second hard phase is allowed to contain Ti compounds that contain no Nb (such as TiCN and TiWC), and metal elements such tungsten (W), chromium (Cr), and cobalt (Co) in addition to the first compound within a range where the effect of the present disclosure is not impaired. A total content of W, Cr, and Co in the second hard phase may be 0 mass % or more and 3 mass % or less, for example. The contents of W, Cr, and Co in the second hard phase are measured by TEM-EDX.

The second hard phase that contains the at least one first compound selected from the group consisting of TiNbC, TiNbN, and TiNbCN is confirmed in the following procedure.

(A3) A given position of the cemented carbide is sliced by using an ion slicer (apparatus: IB09060CIS™, manufactured by JEOL Ltd.) to produce a sample with 30 to 100 nm in thickness. An acceleration voltage of the ion slicer is 6 kV in a slicing process and 2 kV in a finishing process.

(B3) The above sample is observed with a scanning-transmission electron microscope (STEM) (apparatus: JFM-ARM300F™, manufactured by JEOL Ltd.) with a magnification of 50000 to obtain a STEM-high-angle annular dark field scanning transmission electron microscope (HAADF) image. The micrographed regions of the STEM-HAADF image are set to central portions of the sample (where the micrographed regions are all the bulk portions of the cemented carbide), namely positions that do not include a portion where properties obviously differ from those of the bulk portion, such as a proximity of the surface of the cemented carbide. In the measurement conditions, an acceleration voltage is 200 kV.

(C3) Then, the second hard phase particles present in the STEM-HAADF image are subjected to spot analysis with EDX attached to the STEM to quantify the elements that constitute the second hard phase particles. In the STEM-HAADF image, the second hard phase particles are observed as black particles. The spot size is set to a range that includes only the second hard phase with each of the second hard phase. When titanium (Ti), niobium (Nb), and one or both of carbon (C) and nitrogen (N) are present as a result of quantifying the constituent elements, the second hard phase is confirmed to contain the at least one first compound selected from the group consisting of TiNbC, TiNbN, and TiNbCN.

<<Average Particle Diameter>>

In Embodiment 1, the average particle diameter of the second hard phase is 0.03 µm or more and 0.50 µm or less. According to this, welding resistance of the cemented carbide is improved. In addition, the second hard phase hardly triggers breakage, and breakage resistance of the tool that contain the cemented carbide is improved. If the average particle diameter in the second hard phase is less than 0.03 µm, welding resistance of the cemented carbide is likely to be deteriorated. If the average particle diameter in the second hard phase is more than 0.50 µm, breakage resistance of the cemented carbide is likely to be deteriorated. A lower limit of the average particle diameter of the second hard phase is 0.03 µm or more, may be 0.04 µm or more, may be 0.05 µm or more, may be 0.06 µm or more, may be 0.15 µm or more, or may be 0.20 µm or more. An upper limit of the average particle diameter of the second hard phase is 0.50 µm or less, may be 0.45 µm or less, may be 0.40 µm or less, or may be 0.35 µm or less. The average particle diameter of the second hard phase may be 0.04 µm or more and 0.45 µm or less, or may be 0.05 µm or more and 0.40 µm or less.

A method for measuring the average particle diameter of the second hard phase is as follows.

(A4) In the same method as of (A1) to (E1) of the aforementioned method for measuring the content of the first hard phase, the content of the second hard phase, and the content of the binder phase in the cemented carbide, the existence region of the second hard phase is specified in the first image.

(B4) A rectangular measurement field with 40.3 µm in length×30.2 µm in width is each set in five of the first images. Using the image analysis software (ImageJ ver. 1.51J8), an outer edge of each second hard phase in the measurement field is specified to calculate an equivalent area diameter of each second hard phase.

(C4) Based on all the equivalent area diameters of the second hard phase in the five measurement fields, the average particle diameter of the second hard phase is calculated. The average particle diameter of the second hard phase herein means an arithmetical average of equal area circle diameters (Heywood diameters) of a plurality of crystal grains that constitute the second hard phase.

In the measurements by the applicant, it has been confirmed that even when a plurality of measurements are performed for the average particle diameter of the second hard phase in accordance with the above procedure, the measurement results have almost no variation as long as the identical sample is measured, wherein in the above procedure, a cutout portion for the cross section of the cemented carbide is randomly set, a micrographic region as described in the above (B1) is randomly set on the cross section, and a measurement field as described in the above (B4) is randomly set.

<Binder Phase>
<<Composition>>

In Embodiment 1, the binder phase contains cobalt at 80 mass % or more. The content of cobalt in the binder phase may be 90 mass % or more and 100 mass % or less, may be 95 mass % or more and 100 mass % or less, may be 98 mass % or more and 100 mass % or less, or may be 100 mass %. The content of cobalt in the binder phase is measured by ICP emission spectroscopy.

The binder phase may contain iron (Fe), nickel (Ni), tungsten (W), chromium (Cr), vanadium (V), titanium (Ti), niobium (Nb), and tantalum (Ta) and the like in addition to the first element.

<<Average Particle Diameter and D95>>

In Embodiment 1, an average particle diameter of the binder phase is 0.15 µm or more and 0.45 µm or less, a cumulative 95% particle diameter D95 on an area basis of the binder phase (hereinafter, also referred to as "D95 of the binder phase") is 1.5 µm or less, and a degree of dispersion of the binder phase is 0.15 or more and 0.25 or less. According to this, the cemented carbide can have excellent welding resistance. To set the average particle diameter of the binder phase to less than 0.15 µm, the particle diameter of the first hard phase is mainly required to be fine. In this case, the mechanical strength is deteriorated. If the average particle diameter in the binder phase is more than 0.45 µm, welding resistance is deteriorated. If D95 of the binder phase is more than 1.5 µm, welding partially occurs to be likely to cause breakage.

A lower limit of the average particle diameter of the binder phase is 0.15 µm or more, may be 0.20 µm or more, or may be 0.30 µm or more. An upper limit of the average particle diameter of the binder phase is 0.45 µm or less, or may be 0.40 µm or less. The average particle diameter of the binder phase may be 0.15 µm or more and 0.40 µm or less, may be 0.20 µm or more and 0.45 µm or less, or may be 0.30 µm or more and 0.40 µm or less. The average particle diameter of the binder phase herein means an arithmetical average of equal area circle diameters (Heywood diameters) of the binder phase measured by the following measurement method.

A lower limit of D95 of the binder phase may be 0.30 µm or more, may be 0.40 µm or more, may be 0.45 µm or more, may be 0.60 µm or more, may be 0.65 µm or more, or may be 0.80 µm or more. An upper limit of D95 of the binder phase is 1.50 µm or less, may be 1.30 µm or less, may be 1.20 µm or less, or may be 1.00 µm or less. D95 of the binder phase may be 0.30 µm or more and 1.50 µm or less, or may be 0.60 µm or more and 1.30 µm or less.

Methods for measuring the average particle diameter and D95 of the binder phase are as follows.

(A5) In the same method as of (A1) to (E1) of the aforementioned method for measuring the content of the first hard phase, the content of the second hard phase, and the content of the binder phase in the cemented carbide, the existence region of the binder phase is specified in the first image.

(B5) A rectangular measurement field with 40.3 μm in length×30.2 μm in width is each set in five of the first images. Using the image analysis software (ImageJ ver. 1.51J8), an outer edge of each binder phase in the measurement field is specified to calculate an equivalent area diameter of each binder phase.

(C5) Based on all the equivalent area diameters of the binder phase in the five measurement fields, the average particle diameter and D95 of the binder phase are calculated. The average particle diameter of the binder phase herein means an arithmetical average of equal area circle diameters (Heywood diameters) of a plurality of crystal grains that constitute the binder phase.

In the measurements by the applicant, it has been confirmed that even when a plurality of measurements are performed for the average particle diameter and D95 of the binder phase in accordance with the above procedure, the measurement results have almost no variation as long as the identical sample is measured, wherein in the above procedure, a cutout portion for the cross section of the cemented carbide is randomly set, a micrographic region as described in the above (B1) is randomly set on the cross section, and a measurement field as described in the above (C5) is randomly set.

<<Degree of Dispersion>>

In Embodiment 1, a degree of dispersion of the binder phase is 0.15 or more and 0.25 or less. According to this, the binder phase is finely dispersed and the structure of the cemented carbide becomes uniform, and the cemented carbide can have excellent welding resistance. To set the degree of dispersion of the binder phase to less than 0.15, the particle diameter of the first hard phase is mainly required to be fine. In this case, the mechanical strength is deteriorated. If the degree of dispersion of the binder phase is more than 0.25, welding resistance is deteriorated. A lower limit of the degree of dispersion of the binder phase is 0.15 or more, may be 0.16 or more, or may be 0.17 or more. An upper limit of the degree of dispersion of the binder phase is 0.25 or less, may be 0.24 or less, may be 0.23 or less, or may be 0.21 or less. The degree of dispersion of the binder phase may be 0.16 or more and 0.24 or less, or may be 0.17 or more and 0.23 or less.

The degree of dispersion of the binder phase herein is measured by using a Voronoi diagram. The specific measuring method is as follows.

(A6) In the same method as of (A1) to (E1) of the aforementioned method for measuring the content of the first hard phase, the content of the binder phase, and the content of the binder phase in the cemented carbide, the existence region of the binder phase is specified in the first image.

(B6) One rectangular measurement region with 40.3 μm×30.2 μm is set in the first image. Using the image analysis software (ImageJ ver. 1.51J8), a Voronoi cell is calculated in the measurement region at the center position of gravity of each binder phase as a generator to produce a Voronoi diagram. The Voronoi cell is a cell surrounded by Voronoi boundaries formed by division between two close generators with a perpendicular bisector when a plurality of generators are disposed on the identical plane.

Figure 2:
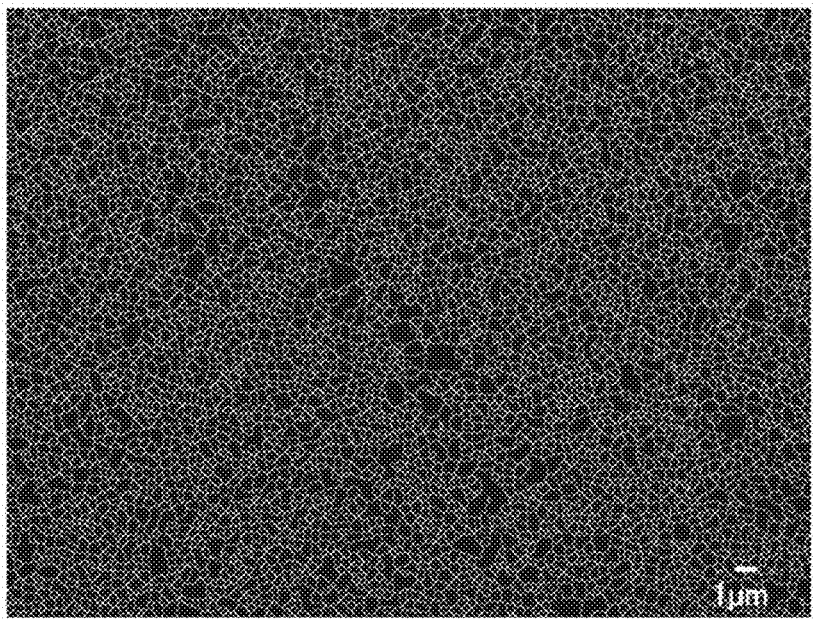
FIG. 2 is a Voronoi diagram produced based on the backscattered electron image shown in FIG. 1.

FIG. 2 shows the Voronoi diagram produced based on the backscattered electron image shown in FIG. 1. In FIG. 2, each region surrounded by white lines is the Voronoi cell.

(C6) Using the image analysis software (ImageJ ver. 1.51J8), each of Voronoi area ($\mu m^2$) on all the Voronoi cells in the measurement region is calculated. Here, the Voronoi cells in the measurement region mean the Voronoi cell in which an entirety of the Voronoi cell is present in the measurement region. Therefore, when a part of the Voronoi cell is present outside the measurement region, such a Voronoi cell is not included in the Voronoi cell in the measurement region. A standard deviation σ of all the Voronoi areas in the measurement region is calculated.

(D6) The above standard deviation σ is calculated in five different measurement regions that are not overlapped each other. In the present disclosure, an average of the standard deviations σ in the five measurement regions corresponds to the degree of dispersion of the binder phase in the cemented carbide.

In the measurements by the applicant, it has been confirmed that even when a plurality of measurements are performed for the degree of dispersion of the binder phase in accordance with the above procedure, the measurement results have almost no variation as long as the identical sample is measured, wherein in the above procedure, a cutout portion for the cross section of the cemented carbide is randomly set, and a measurement region as described in the above (B6) is randomly set.

<Nb/(Ti+Nb) Percentage in Cemented Carbide>

In the cemented carbide of Embodiment 1, a percentage of niobium relative to a total of titanium and niobium on a mass basis (hereinafter, also referred to as "Nb/(Ti+Nb) percentage") may be 2% or more and 30% or less, or may be 3% or more and 20% or less. According to this, the second hard phase can be finely dispersed in the cemented carbide, and welding resistance of the cemented carbide can be improved. If the Nb/(Ti+Nb) percentage is less than 2% or absent, the effect of dispersing the second hard phase particles is small and thus likely to deteriorate welding resistance. If the Nb/(Ti+Nb) percentage is more than 30%, the second hard phase particle is likely to cause grain growth, resulting in reduced mechanical strength and breakage. A lower limit of the Nb/(Ti+Nb) percentage may be 4% or more, may be 5% or more, or may be 10% or more. An upper limit of the Nb/(Ti+Nb) percentage may be 18% or less, or may be 16% or less. The Nb/(Ti+Nb) percentage may be 4% or more and 18% or less, or may be 5% or more and 16% or less.

Herein, the percentage of niobium relative to the total of titanium and niobium on a mass basis in the cemented carbide is measured by ICP emission spectrometry.

In the measurements by the applicant, it has been confirmed that even when a plurality of measurements are performed for an average of the Nb percentage in the cemented carbide, the measurement results have almost no variation in a plurality of samples manufactured under the same conditions.

<Content of Vanadium in Cemented Carbide>

A content of vanadium in the cemented carbide in Embodiment 1 may be 0 mass % or more and 0.2 mass % or less, or may be 0 mass % or more and 0.1 mass % or less. According to this, formation of a coarse precipitate that contains vanadium in the cemented carbide and precipitation of vanadium on a boundary between the WC particles can be inhibited. Accordingly, deterioration of mechanical strength of the cemented carbide is inhibited. The content of vanadium in the cemented carbide is measured by ICP emission spectroscopy.

<Content of Chromium in Cemented Carbide>

A content of chromium in the cemented carbide in Embodiment 1 may be 0.2 mass % or more and 1.0 mass % or less, or may be 0.4 mass % or more and 0.8 mass % or less. According to this, formation of a coarse precipitate that contains chromium in the cemented carbide and precipitation of chromium on a boundary between the WC particles can be inhibited. Accordingly, deterioration of mechanical strength of the cemented carbide is inhibited. The content of chromium in the cemented carbide is measured by ICP emission spectroscopy.

<Manufacturing Method>

The cemented carbide of Embodiment 1 can be manufactured by the following method, for example.

<<Preparation of Raw Materials>>

Raw material powders are prepared. As a raw material for the first hard phase, two types of tungsten carbide (WC) powder that have different average particle diameters are prepared. Hereinafter, the two types of WC powder are also referred to as the first WC powder and the second WC powder. As a raw material powder for the second hard phase, a carbide, a nitride, a carbonitride, an oxide, a composite carbonitride, or the like that contain one or both of titanium and niobium is prepared. Examples of the raw material for the second hard phase include titanium carbonitride (TiCN) powder and niobium carbide (NbC) powder. As a raw material for the binder phase, cobalt (Co) powder, and as necessary, iron (Fe) powder and nickel (Ni) powder are prepared. As a grain growth inhibitor, chromium carbide ($Cr_3C_2$) powder and vanadium carbide (VC) powder are prepared.

An average particle diameter of the first WC powder may be 0.3 μm or more and 0.8 μm or less. An average particle diameter of the second WC powder may be 0.1 or more and 0.5 μm or less. The average particle diameter of the first WC powder is larger than the average particle diameter of the second WC powder. The average particle diameter is measured by using a particle size distribution measurement apparatus manufactured by MicrotracBEL Corp. (product name: MT3300EX).

An average particle diameter of the titanium carbonitride (TiCN) powder may be 0.1 μm or more and 1.0 μm or less. An average particle diameter of the niobium carbide (NbC) powder may be 0.1 μm or more and 2.0 μm or less. An average particle diameter of the cobalt (Co) powder may be 0.1 μm or more and 5 μm or less. An average particle diameter of the iron (Fe) powder may be 0.1 μm or more and 5 μm or less. An average particle diameter of the nickel (Ni) powder may be 0.1 μm or more and 5 μm or less. The average particle diameters of these raw material powders mean a median diameter d50 on a number basis of sphere-equivalent diameter of the raw material powder. The average particle diameters of the raw material powders are measured by using a particle size distribution measurement apparatus manufactured by MicrotracBEL Corp. (product name: MT3300EX).

<<Mix of Raw Material Powders>

Then, the raw material powders are mixed to obtain a mixed powder. As a mixer, a ball mill, an Attritor, a Karman mixer, or the like may be used. The mixing time may be appropriately regulated depending on each of the mixing method. First, the raw material powder for the second hard phase (for example, the titanium carbonitride (TiCN) powder and the niobium carbide (NbC) powder) are fed into the mixer, and the mixture may be premixed at a predetermined time to micronize these powders. The premixing time may be appropriately set depending on the average particle diameters of the raw material powders for the second hard phase. For example, when the average particle diameter of the titanium carbonitride (TiCN) powder is 0.1 μm or more and 1.0 μm or less and the average particle diameter of the niobium carbide (NbC) powder is 0.1 μm or more and 2.0 μm or less, the premixing time may be 60 minutes or more and 120 minutes or less. Thereafter, the first WC powder, the second WC powder, the grain growth inhibitor, and the raw material powder that contains the cobalt powder for the binder phase are fed into the mixer, and mixed with the other raw material powders to obtain the mixed powder.

A mixing ratio of the raw material powders is regulated so that, in the cemented carbide, the content of the second hard phase is 0.10 vol % or more and 0.50 vol % or less and the content of the binder phase is 8.0 vol % or more and 16.0 vol % or less.

When the vanadium carbide (VC) powder is used as the grain growth inhibitor, the mixing ratio is regulated so that a content of vanadium in the mixed powder is 0.2 mass % or less. When the chromium carbide ($Cr_3C_2$) powder is used as the grain growth inhibitor, the mixing ratio is regulated so that a content of $Cr_3C_2$ in the mixed powder is 1.3 mass % or less.

<<Shaping>>

Then, the mixed powder is shaped into a desired shape to obtain a green body. As the shaping method and shaping conditions, common methods and conditions may be adopted, and not particularly limited.

<<Sintering>>

Then, the green body is placed into a sintering furnace, and conditions are held in a vacuum atmosphere or in a gas atmosphere such as nitrogen and argon, at a temperature of 1380 to 1420° C., and a pressure of 0.3 to 30 kPa for 0 to 120 minutes for sintering the green body to obtained a sintered material. Then, the sintered material can be rapidly cooled to room temperature to obtain the cemented carbide.

<<Features of Manufacturing Method>>

In the above mixing step, the first WC powder and the second WC powder, which have different average particle diameters, are mixed. It is presumed that first WC particles, which constitute the first WC powder, and second WC particles, which constitute the second WC powder, are mixed in the structure of the cemented carbide, and ultrafine second WC particles can fill a space between the fine first WC particles to reduce an average free path of the binder phase. It is presumed that this finely disperses the binder phase to easily present in the cemented carbide.

In the above mixing step, the raw material powders for the second hard phase (for example, the titanium carbonitride (TiCN) powder and the niobium carbide (NbC) powder) are fed into the mixer, and the mixture is premixed for a predetermined time to regulate these powders to have predetermined particle diameters. It is presumed that this finely disperse the binder phase to easily present in the cemented carbide.

To finely disperse the binder phase that contains cobalt in the cemented carbide, sintering has been conventionally required at more than 1420° C. However, the WC particle is likely to cause grain growth when it is sintered at more than 1420° C., and the binder phase becomes coarse with the grain growth of the WC particle. To micronize the binder phase, a large amount of vanadium or chromium, which has the effect of inhibiting the grain growth, is required to be added, or sintering at a temperature of 1420° C. or less is required. When a large amount of vanadium or chromium, which has the effect of inhibiting the grain growth, is added, a coarse precipitate forms in the cemented carbide, or vanadium and chromium precipitate on a boundary between the WC particles. Thus, mechanical strength of the cemented carbide is deteriorated. Sintering at a temperature of 1420° C. or less fails to finely disperse the binder phase that contains cobalt in the cemented carbide. The conventional method for manufacturing a cemented carbide cannot achieve at least one of good fine dispersibility of the binder phase and good mechanical strength of the cemented carbide.

As the grain growth inhibitor in the manufacturing method of the present disclosure, when the vanadium carbide (VC) powder is used, the content of vanadium in the mixed powder is regulated to 0.2 mass % or less. When the chromium carbide ($Cr_3C_2$) powder is used, the content of $Cr_3C_2$ in the mixed powder is regulated to 1.3 mass % or less. Furthermore, the content of the cobalt powder in the mixed powder is regulated so that the content of the binder phase in the cemented carbide is 8.0 vol % or more and 16.0 vol % or less. As the raw material powder for the second hard phase, the powder that contains a predetermined amount of niobium is used. According to this, when sintering is performed at a temperature of 1420° C. or less, the grain growth of the WC particle is inhibited, and niobium forms a solid solution in the binder phase to reprecipitate together with titanium in the binder phase, particularly in a coarse binder phase portion. This can finely divide the binder phase to improve fine dispersibility of the binder phase. The present inventors have found such a manufacturing method.

If the raw material powder for the second hard phase contains no niobium, dispersibility of the second hard phase is deteriorated, which is difficult to provide the effect of dividing the binder phase. If the content of niobium in the raw material powder for the second hard phase is large, the grain growth in the second hard phase is enhanced to precipitate a coarse second hard phase, which deteriorates characteristics such as snapping resistance.

Embodiment 2: Tool

A tool of an embodiment of the present disclosure (hereinafter, also referred to as "Embodiment 2") is a cutting tool comprising the cemented carbide described in Embodiment 1. The tool of Embodiment 2 can have a long tool lifetime. This is presumably because the cemented carbide has the original excellent mechanical strength and in addition, excellent welding resistance. In the tool of Embodiment 2, at least a part involved with cutting preferably contains the cemented carbide of Embodiment 1. The part involved with cutting means a region where a distance from an edge is within 500 μm or less.

Examples of the tool include a drill, a microdrill, an endmill, an indexable cutting insert for a drill, an indexable cutting insert for an endmill, a throwaway insert for milling, a throwaway insert for turning, a metal saw, a gear-cutting tool, a reamer, a tap, a cutting bit, a wearing-resistant tool, and a tool for friction stir joining.

Examples

The present embodiments will be more specifically described with Example. However, the present embodiments are not limited by these Examples.

[Production of Cemented Carbide]

As raw material powders, a first tungsten carbide (WC) powder, a second tungsten carbide (WC) powder, a chromium carbide ($Cr_3C_2$) powder, a vanadium carbide (VC) powder, a titanium carbonitride (TiCN) powder, a niobium carbide (NbC) powder, and a cobalt (Co) powder were prepared.

An average particle diameter of each of the first tungsten carbide powder and the second tungsten carbide powder was as described in the columns "First WC powder" and "Second WC powder" in Table 1.

An average particle diameter of the $Cr_3C_2$ powder was 1.5 μm, an average particle diameter of the VC powder was 0.8 μm, an average particle diameter of the TiCN powder was 0.7 μm, an average particle diameter of the NbC powder was 1.0 μm, and an average particle diameter of the Co powder was 1.2 μm. The average particle diameters of the raw material powders were values measured by using a particle size distribution measurement apparatus manufactured by MicrotracBEL Corp. (product name: MT3300EX).

The raw material powders were mixed at a ratio described in the column "Raw material powder" in Table 1 to obtain a mixed powder. As a mixer, a ball mill was used. First, the TiCN powder and the NbC powder were fed into the mixer to be premixed. The premixing time was as shown in the column "Premixing time" in Table 2. The description "-" described in the column "Premixing time" represents that the premixing of the TiCN powder and the NbC powder was not performed, and the TiCN powder and the NbC powder were started to be mixed simultaneously to the other raw material powders. Thereafter, the first WC powder, the second WC powder, the grain growth inhibitor, and the raw material powder that contained the Co powder for the binder phase were fed into the mixer to mix. The mixing time (mixing time that excluded the premixing) was as shown in the column "Mixing time" in Table 2.

The obtained mixed powder was pressed to obtain a round-bar shaped green body with ϕ6.4 mm.

The obtained green body was placed into a sintering furnace, and a temperature and a pressure were raised to a temperature and a pressure shown in the columns "Temperature" and "Pressure" of "Sintering conditions" in Table 2, and the conditions were held for a time shown in the column "Time" to obtain a sintered material. Then, the sintered material was rapidly cooled to room temperature to obtain a cemented carbide of each sample.

[Production of Tool]

A round bar made of the obtained cemented carbide was processed to produce an endmill with a diameter of ϕ6.0 mm.

[Table 1]

TABLE 1

| | Raw material powder | | | | | | | | |
|---|---|---|---|---|---|---|---|---|---|
| | First WC powder | | Second WC powder | | | | | | |
| Sample No. | Average particle diameter μm | mass % | Average particle diameter μm | mass % | $Cr_3C_2$ mass % | VC mass % | TiCN mass % | NbC mass % | Co mass % |
| 1 | 0.5 | 69.22 | 0.2 | 23.08 | 0.60 | — | 0.09 | 0.01 | 7.00 |
| 2 | 0.5 | 65.02 | 0.2 | 21.68 | 1.00 | — | 0.27 | 0.03 | 12.00 |
| 3 | 0.5 | 62.40 | 0.2 | 20.8 | 1.30 | — | 0.45 | 0.05 | 15.00 |
| 4 | 0.5 | 62.70 | 0.2 | 20.9 | 1.30 | — | 0.09 | 0.01 | 15.00 |
| 5 | 0.5 | 68.92 | 0.2 | 22.98 | 0.60 | — | 0.45 | 0.05 | 7.00 |
| 6 | 0.3 | 65.02 | 0.2 | 21.68 | 1.00 | — | 0.27 | 0.03 | 12.00 |
| 7 | 0.8 | 65.02 | 0.5 | 21.68 | 1.00 | — | 0.27 | 0.03 | 12.00 |
| 8 | 0.5 | 65.02 | 0.2 | 21.68 | 1.00 | — | 0.27 | 0.03 | 12.00 |
| 9 | 0.5 | 65.02 | 0.2 | 21.68 | 1.00 | — | 0.21 | 0.09 | 12.00 |
| 10 | 0.5 | 64.87 | 0.2 | 21.63 | 1.00 | 0.20 | 0.27 | 0.03 | 12.00 |
| 11 | 0.5 | 65.02 | 0.2 | 21.68 | 1.00 | — | 0.27 | 0.03 | 12.00 |
| 12 | 0.5 | 65.02 | 0.2 | 21.68 | 1.00 | — | 0.29 | 0.01 | 12.00 |
| 13 | 0.5 | 65.02 | 0.2 | 21.68 | 1.00 | — | 0.29 | 0.01 | 12.00 |
| 14 | 0.5 | 65.02 | 0.2 | 21.68 | 1.00 | — | 0.24 | 0.06 | 12.00 |
| 101 | 0.5 | 65.21 | 0.2 | 21.74 | 1.00 | — | 0.04 | 0.01 | 12.00 |
| 102 | 0.5 | 64.80 | 0.2 | 21.60 | 1.00 | — | 0.55 | 0.05 | 12.00 |
| 103 | 0.5 | 69.52 | 0.2 | 23.18 | 1.00 | — | 0.27 | 0.03 | 6.00 |
| 104 | 0.5 | 62.02 | 0.2 | 20.68 | 1.00 | — | 0.27 | 0.03 | 16.00 |
| 105 | 0.3 | 64.95 | 0.2 | 21.65 | 1.00 | 0.10 | 0.27 | 0.03 | 12.00 |
| 106 | 1.2 | 65.02 | 0.5 | 21.68 | 1.00 | — | 0.27 | 0.03 | 12.00 |
| 107 | 0.5 | 65.02 | 0.2 | 21.68 | 1.00 | — | 0.28 | 0.02 | 12.00 |
| 108 | 0.5 | 65.02 | 0.2 | 21.68 | 1.00 | — | 0.20 | 0.10 | 12.00 |
| 109 | 0.5 | 65.02 | 0.2 | 21.68 | 1.00 | — | 0.30 | — | 12.00 |
| 110 | 0.5 | 65.10 | 0.2 | 21.70 | 1.00 | 0.20 | — | — | 12.00 |

[Table 2]

TABLE 2

| | Mixing conditions | | Sintering conditions | | |
|---|---|---|---|---|---|
| Sample No. | Premixing time minutes | Mixing time minutes | Temperature ° C. | Pressure kPa | Time minutes |
| 1 | 60 | 600 | 1400 | 20 | 60 |
| 2 | 60 | 600 | 1400 | 20 | 60 |
| 3 | 60 | 600 | 1400 | 20 | 60 |
| 4 | 60 | 600 | 1400 | 20 | 60 |
| 5 | 60 | 600 | 1400 | 20 | 60 |
| 6 | 60 | 600 | 1400 | 20 | 60 |
| 7 | 60 | 600 | 1400 | 20 | 60 |
| 8 | 120 | 600 | 1400 | 20 | 60 |
| 9 | 60 | 600 | 1400 | 20 | 60 |
| 10 | 60 | 600 | 1420 | 20 | 60 |
| 11 | 60 | 600 | 1380 | 20 | 60 |
| 12 | 60 | 600 | 1400 | 20 | 60 |
| 13 | 60 | 600 | 1400 | 20 | 60 |
| 14 | 60 | 600 | 1400 | 20 | 60 |
| 101 | 60 | 600 | 1400 | 20 | 60 |
| 102 | 60 | 600 | 1400 | 20 | 60 |
| 103 | 60 | 600 | 1400 | 20 | 60 |
| 104 | 60 | 600 | 1400 | 20 | 60 |
| 105 | 60 | 600 | 1370 | 20 | 60 |
| 106 | 60 | 600 | 1400 | 20 | 60 |
| 107 | 180 | 600 | 1400 | 20 | 60 |
| 108 | — | 600 | 1400 | 20 | 60 |
| 109 | 60 | 600 | 1400 | 20 | 60 |
| 110 | 60 | 600 | 1400 | 20 | 60 |

[Evaluation]
<Cemented Carbide>
<<Composition of Cemented Carbide>>

Contents (vol %) of the first hard phase, the second hard phase, and the binder phase in the cemented carbide of each sample were measured. The specific measurement method was as described in Embodiment 1. The results were shown in the columns "Content of first hard phase", "Content of second hard phase", and "Content of binder phase" of "Cemented carbide" in Table 3. The description "Second hard phase: 0.00, TICN: 0.30" in the column "Content of second hard phase" of Sample 109 represents that the second hard phase is absent and TiCN is present at 0.30 vol % instead thereof in Sample 109.

<<D10, D90, and Average Particle Diameter of First Hard Phase>>

D10, D90, and an average particle diameter of the first hard phase in the cemented carbide of each sample were measured. The specific measurement methods were as described in Embodiment 1. The results are shown in the columns "D10", "D90", and "Average particle diameter" of "First hard phase" in Table 4.

<<Composition of Second Hard Phase>>

A composition of the second hard phase in the cemented carbide of each sample was measured. The specific measurement method was as described in Embodiment 1. In the existence region of the second hard phase in the STEM-HAADF image, when a region where titanium (Ti), niobium (Nb), and one or both of carbon (C) and nitrogen (N) are present is present, the second hard phase is confirmed to contain at least one first compound selected from the group consisting of TiNbC, TiNbN, and TiNbCN. When the first compound is present in the second hard phase, "present" is shown in the column "First compound" of "Second hard phase" in Table 4. When the first compound is absent in the second hard phase, "absent" is shown in the column "First compound" of "Second hard phase" in Table 4. The description "-" in the column "Composition" represents that the second hard phase is absent.

<<Average Particle Diameter of Second Hard Phase>>

An average particle diameter of the second hard phase in the cemented carbide of each sample was measured. The specific measurement method was as described in Embodiment 1. The results are shown in the column "Average particle diameter" of "Second hard phase" in Table 4.

<<Composition of Binder Phase>>

A content of cobalt in the binder phase in the cemented carbide of each sample was measured by ICP emission spectroscopy. In all the samples, the content of cobalt in the binder phase was confirmed to be 80 mass % or more.

<<Average Particle Diameter and D95 of Binder Phase>>

An average particle diameter and D95 of the binder phase in the cemented carbide of each sample were measured. The specific measurement method was as described in Embodiment 1. The results are shown in the columns "Average particle diameter" and "D95" of "Binder phase" in Table 4.

<<Degree of Dispersion of Binder Phase>>

A degree of dispersion of the binder phase in the cemented carbide of each sample was measured. The specific measurement method was as described in Embodiment 1. The results are shown in the column "Degree of dispersion" of "Binder phase" in Table 4.

<<Nb/(Ti+Nb) Percentage in Cemented Carbide>>

A percentage of niobium relative to a total of titanium and niobium on a mass basis (Nb percentage) in the cemented carbide of the cemented carbide of each sample was measured by ICP emission spectrometry. The results are shown in the column "Nb/(Ti+Nb) percentage" of "Cemented carbide" in Table 3.

<<Content of Vanadium and Content of Chromium in Cemented Carbide

A content of vanadium and a content of chromium in the cemented carbide of each sample were measured by ICP emission spectrometry. The results are shown in the columns "V content" and "Cr content" of "Cemented carbide" in Table 3.

[Table 3]

TABLE 3

| | Cemented carbide | | | | | |
|---|---|---|---|---|---|---|
| Sample No. | Content of first hard phase vol % | Content of second hard phase vol % | Content of binder phase vol % | V content mass % | Cr content mass % | Nb/(Ti + Nb) percentage % |
| 1 | 91.9 | 0.10 | 8.00 | — | 0.60 | 10 |
| 2 | 86.7 | 0.30 | 13.00 | — | 1.00 | 10 |
| 3 | 83.5 | 0.50 | 16.00 | — | 1.30 | 10 |
| 4 | 83.9 | 0.10 | 16.00 | — | 1.30 | 10 |
| 5 | 91.5 | 0.50 | 8.00 | — | 0.60 | 10 |
| 6 | 86.7 | 0.30 | 13.00 | — | 1.00 | 10 |
| 7 | 86.7 | 0.30 | 13.00 | — | 1.00 | 10 |
| 8 | 86.7 | 0.30 | 13.00 | — | 1.00 | 10 |
| 9 | 86.7 | 0.30 | 13.00 | — | 1.00 | 30 |
| 10 | 86.7 | 0.30 | 13.00 | 0.20 | 1.00 | 10 |
| 11 | 86.7 | 0.30 | 13.00 | — | 1.00 | 10 |
| 12 | 86.7 | 0.30 | 13.00 | — | 1.00 | 2 |
| 13 | 86.7 | 0.30 | 13.00 | — | 1.00 | 3 |
| 14 | 86.7 | 0.30 | 13.00 | — | 1.00 | 20 |
| 101 | 87.0 | 0.05 | 13.00 | — | 1.00 | 20 |
| 102 | 86.4 | 0.60 | 13.00 | — | 1.00 | 10 |
| 103 | 92.9 | 0.10 | 7.00 | — | 1.00 | 10 |
| 104 | 82.5 | 0.50 | 17.00 | — | 1.00 | 10 |
| 105 | 86.7 | 0.30 | 13.00 | 0.10 | 1.00 | 10 |
| 106 | 86.7 | 0.30 | 13.00 | — | 1.00 | 10 |
| 107 | 86.7 | 0.30 | 13.00 | — | 1.00 | 7 |
| 108 | 86.7 | 0.30 | 13.00 | — | 1.00 | 34 |
| 109 | 86.7 | Second hard phase: 0.00 TiCN: 0.30. | 13.00 | — | 1.00 | — |
| 110 | 87.0 | — | 13.00 | 0.20 | 1.00 | — |

[Table 4]

TABLE 4

| Sample No. | Cemented carbide ||||||||
|---|---|---|---|---|---|---|---|---|
| | First hard phase ||| Second hard phase ||| Binder phase ||
| | D10 μm | D90 μm | Average particle diameter μm | First compound | Average particle diameter μm | Average particle diameter μm | D95 | Degree of dispersion |
| 1 | 0.33 | 0.95 | 0.62 | present | 0.06 | 0.20 | 0.45 | 0.17 |
| 2 | 0.40 | 1.15 | 0.70 | present | 0.25 | 0.35 | 0.85 | 0.21 |
| 3 | 0.48 | 1.30 | 0.78 | present | 0.45 | 0.43 | 1.20 | 0.23 |
| 4 | 0.53 | 1.40 | 0.82 | present | 0.09 | 0.45 | 1.50 | 0.25 |
| 5 | 0.30 | 0.90 | 0.60 | present | 0.37 | 0.17 | 0.37 | 0.15 |
| 6 | 0.30 | 0.90 | 0.60 | present | 0.22 | 0.15 | 0.65 | 0.19 |
| 7 | 0.60 | 1.40 | 0.90 | present | 0.35 | 0.45 | 1.50 | 0.24 |
| 8 | 0.38 | 1.05 | 0.67 | present | 0.03 | 0.39 | 1.05 | 0.17 |
| 9 | 0.45 | 1.28 | 0.75 | present | 0.50 | 0.41 | 1.00 | 0.24 |
| 10 | 0.39 | 1.12 | 0.69 | present | 0.17 | 0.33 | 0.81 | 0.15 |
| 11 | 0.36 | 1.04 | 0.64 | present | 0.15 | 0.31 | 1.03 | 0.25 |
| 12 | 0.42 | 1.24 | 0.73 | present | 0.34 | 0.35 | 0.95 | 0.23 |
| 13 | 0.42 | 1.24 | 0.73 | present | 0.32 | 0.35 | 0.95 | 0.21 |
| 14 | 0.37 | 1.04 | 0.67 | present | 0.29 | 0.32 | 0.82 | 0.23 |
| 101 | 0.51 | 1.32 | 0.81 | present | 0.01 | 0.43 | 1.60 | 0.35 |
| 102 | 0.34 | 1.02 | 0.64 | present | 0.62 | 0.32 | 0.86 | 0.26 |
| 103 | 0.31 | 0.89 | 0.58 | present | 0.05 | 0.17 | 0.42 | 0.16 |
| 104 | 0.54 | 1.40 | 0.95 | present | 0.53 | 0.48 | 1.60 | 0.27 |
| 105 | 0.28 | 0.85 | 0.58 | present | 0.19 | 0.13 | 0.58 | 0.18 |
| 106 | 0.62 | 1.42 | 0.92 | present | 0.42 | 0.50 | 2.00 | 0.29 |
| 107 | 0.34 | 1.01 | 0.64 | present | 0.02 | 0.40 | 1.40 | 0.23 |
| 108 | 0.49 | 1.42 | 0.78 | present | 0.60 | 0.43 | 1.10 | 0.25 |
| 109 | 0.41 | 1.18 | 0.71 | absent | — | 0.37 | 1.30 | 0.28 |
| 110 | 0.40 | 1.15 | 0.70 | absent | — | 0.38 | 2.10 | 0.43 |

<Tool>
<Cutting Test>

A cutting test was performed by using the endmill of each sample under the following cutting conditions to evaluate breakage resistance and welding resistance. The breakage resistance was evaluated based on a cut length (m) until breakage reached 100 μm. A longer cut length indicates more excellent breakage resistance and a longer tool lifetime. The welding resistance was evaluated based on an average welding width (μm) at a time of the breakage. A case where the welding width is 30 μm or less means excellent welding resistance. The obtained results (namely, the cut length and the welding width) are described in the item "Breakage resistance [m]" and the item "Welding resistance [μm]" in Table 5.

(Cutting Conditions)
  Workpiece: Ti-6Al-4V (titanium alloy (titanium-based hard-to-cut material))
  Cutting rate: 120 m/min
  Feeding: 0.02 mm/edge
  Axial depth of cut: 2.0 mm
  Radial depth of cut: 2.5 mm
  Presence/absence of water-soluble coolant: presence

[Table 5]

TABLE 5

| Sample No. | Cutting test ||
|---|---|---|
| | Breakage resistance Cut length m | Welding resistance Welded area μm |
| 1 | 90 | 5 |
| 2 | 140 | 10 |
| 3 | 100 | 25 |
| 4 | 90 | 30 |
| 5 | 80 | 4 |
| 6 | 110 | 7 |
| 7 | 100 | 20 |
| 8 | 130 | 15 |
| 9 | 120 | 20 |
| 10 | 110 | 6 |
| 11 | 120 | 20 |
| 12 | 110 | 15 |
| 13 | 120 | 13 |
| 14 | 130 | 8 |
| 101 | 60 | 25 |
| 102 | 50 | 15 |
| 103 | 20 | 2 |
| 104 | 40 | 45 |
| 105 | 30 | 5 |
| 106 | 30 | 50 |
| 107 | 65 | 22 |
| 108 | 50 | 13 |
| 109 | 40 | 35 |
| 110 | 35 | 40 |

<Discussions>

The cemented carbides and tools of Sample 1 to Sample 14 correspond to Examples. The cemented carbides and tools of Sample 101 to Sample 110 correspond to Comparative Examples. The tools of Sample 1 to Sample 14 were confirmed to have a longer tool lifetime than the tools of Sample 101 to Sample 110. Furthermore, the tools of Sample 1 to Sample 14 were confirmed to have excellent welding resistance.

The embodiments and Examples of the present disclosure have been described as above, but it is anticipated in advance that the aforementioned constitution of embodiments and Examples are appropriately combined or variously modified.

It should be considered that the embodiments and Examples disclosed herein are examples in all points, and should not be limitative. The scope of the present invention is determined by not the above embodiments nor Examples but the claims, and intended to include meaning equivalent to the claims and all modification within the scope.

The invention claimed is:

1. A cemented carbide composed of a first hard phase, a second hard phase and a binder phase, wherein
    the first hard phase is composed of tungsten carbide particles,
    a cumulative 10% particle diameter D10 of the first hard phase on an area basis is 0.30 μm or more and 0.60 μm or less,
    a cumulative 90% particle diameter D90 of the first hard phase on an area basis is 0.90 μm or more and 1.40 μm or less,
    the second hard phase contains at least one first compound selected from the group consisting of TiNbC, TiNbN, and TiNbCN,
    a content of the second hard phase in the cemented carbide is 0.10 vol % or more and 0.50 vol % or less,
    an average particle diameter of the second hard phase is 0.03 μm or more and 0.50 μm or less,
    the binder phase contains cobalt at 80 mass % or more,
    a content of the binder phase in the cemented carbide is 8.0 vol % or more and 16.0 vol % or less,
    an average particle diameter of the binder phase is 0.15 μm or more and 0.45 μm or less,
    a cumulative 95% particle diameter D95 of the binder phase on an area basis is 1.5 μm or less, and
    a degree of dispersion of the binder phase is 0.15 or more and 0.25 or less.

2. The cemented carbide according to claim 1, wherein in the cemented carbide, a percentage of niobium relative to a total of titanium and niobium on a mass basis is 3% or more and 20% or less.

3. The cemented carbide according to claim 1, wherein
    the degree of dispersion is a standard deviation of an area of each Voronoi cell in a Voronoi diagram that is obtained by performing a Voronoi partition with a center of gravity of the binder phase as a generator, and
    the Voronoi diagram is obtained by extracting the binder phases in a backscattered electron image obtained by capturing a cross section of the cemented carbide with a scanning electron microscope, setting a 40.3 μm×30.2 μm rectangular measurement visual field in an image resulting from a binarization treatment of the backscattered electron image, performing Voronoi partitions with centers of gravity of the extracted binder phases as generators and calculating Voronoi cells of all of the generators.

4. A tool, comprising the cemented carbide according to claim 1.

* * * * *